United States Patent
Inoue

(10) Patent No.: US 6,648,334 B2
(45) Date of Patent: Nov. 18, 2003

(54) BRUSH SEAL DEVICE

(75) Inventor: Hideyuki Inoue, Sakado (JP)

(73) Assignee: Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 10/170,340

(22) Filed: Jun. 14, 2002

(65) Prior Publication Data
US 2003/0006559 A1 Jan. 9, 2003

(30) Foreign Application Priority Data

Jun. 29, 2001 (JP) .......................................... 2001-198813

(51) Int. Cl.[7] .............................. F01D 11/02; F16J 15/44
(52) U.S. Cl. ....................................................... 277/355
(58) Field of Search ........................................ 277/355

(56) References Cited

U.S. PATENT DOCUMENTS

| | | | | | |
|---|---|---|---|---|---|
| 4,358,120 A | * | 11/1982 | Moore | ........................ | 277/355 |
| 4,779,904 A | * | 10/1988 | Rich | ........................ | 285/345 |
| 5,031,922 A | * | 7/1991 | Heydrich | ................. | 277/355 |
| 5,042,823 A | * | 8/1991 | Mackay et al. | ............ | 277/355 |
| 5,071,138 A | * | 12/1991 | Mackay et al. | ............ | 277/303 |
| 5,174,582 A | * | 12/1992 | Ferguson | ................. | 277/355 |
| 5,941,685 A | * | 8/1999 | Bagepalli et al. | ......... | 415/173.3 |
| 6,059,526 A | * | 5/2000 | Mayr | ........................ | 415/231 |
| 6,196,550 B1 | * | 3/2001 | Arora et al. | ................. | 277/355 |
| 6,267,381 B1 | * | 7/2001 | Wright | ........................ | 277/355 |
| 6,406,027 B1 | * | 6/2002 | Aksit et al. | ................. | 277/355 |

* cited by examiner

Primary Examiner—Anthony Knight
Assistant Examiner—Vishal Patel
(74) Attorney, Agent, or Firm—Arent Fox Kintner Plotkin & Kahn, PLLC

(57) ABSTRACT

Spring constant of a bristle against the buckling of the bristle is lowered and resilient flexing is facilitated even if a rotary shaft is changed in its movement to contact a brush seal of a brush seal device. In the brush seal device, a bending portion is formed amid a bristle constituting a brush seal to facilitate the resilient buckling deformation.

6 Claims, 10 Drawing Sheets

BRUSH SEAL DEVICE

BACKGROUND OF THE INVENTION

1. Field of the Invention

The present invention relates to a brush seal device for sealing a clearance between a rotary shaft and a mating component that are relatively movable. More particularly, the present invention relates to a brush seal device that is disposed between two components relatively movable in, for example a gas turbine and an airplane and seals the clearance in away that a brush seal is deformed to follow the change in the movement of one component even if the one component changes slightly its movement relative to the other component.

2. Description of the Related Art

As a related art to the present invention there exists a brush seal device 100, as shown in FIG. 9.

FIG. 9 is a sectional view of a brush seal device 100 mounted between a rotary shaft 120 and a casing 110 through which the rotary shaft 120 passes. The casing 110 is a fixed component of, for example, a steam turbine or a gas turbine. The brush seal device 100 attached to the casing 110 seals fluid to be sealed between the casing 110 and the rotary shaft 120.

In FIG. 9, the brush seal device 100 is formed in the shape of a ring and its attachment section 104 on its outer circumference is attached to a channel portion 112 of the casing 110. Main components of the brush seal device 100 are a brush seal 109, a backing plate 102, and a support plate 103. In the brush seal 109, bristles 101 are arranged around a circular circumference to form a wall having a certain width and with their outer ends being coupled to form an attachment section 104. The free end 105 on the inner circumference side of the brush seal 109 faces the rotary shaft 120. The diameter of a bristle 101 generally used is 0.20 mm or more.

An annular backing plate 102 is disposed on a side face of the brush seal 109 with its side face 108 being in contact with the brush seal 109, supporting the bristles 101 against the action due to the pressure of the sealed fluid.

A support plate 103 formed as a ring plate is disposed on the other side face of the brush seal 109 to sandwich, in cooperation with the backing plate 102, the brush seal 109 on its attachment section 104 side, thereby to couples them in a body. The inside diameter of the support plate 103 is made large so that the sealed fluid can effect on the side face of the brush seal 109. The brush seal 109 is exposed at its free end 105.

Outer circumference sides of the backing plate 102, the attachment section 104 of the brush seal 109, and the support plate 103 are welded to form a connecting section 106.

FIG. 10 is a front view of the brush seal 109. The brush seal 109 in FIG. 10 is in a state that the brush seal 109 and the rotary shaft 120 are normally fitted without oscillation, such that the bristles 101 extend straight and oriented to incline relative to the radial direction of the rotary shaft 120. In the normal state of the brush seal 109, the rotary shaft 120 is in contact with or close to the free end 105, as shown by the solid line in FIG. 9.

Another related art is also shown in FIG. 11. In the drawing, a connecting section 106 of a brush seal 109 is contained within an attachment section 131 of a brush holder 130 and is allowed to move in the radial direction. A plate spring 132 urges the connecting section 106 to bear in the radial direction of the rotary shaft 120.

When the rotary shaft 120 eccentrically presses against the brush seal, it becomes complex to calculate two spring constant, one corresponding to the resilient deformation of bristles, and the other to the resilient deformation of the plate spring 132, due to the involvement of the complexity in friction generated from its mounting structure. Since those two spring constants and other frictions are the elements for the design of the device, it is extremely difficult to achieve optimum design or improvement in consideration of the pressure generated by the displacement of the rotary shaft 120. Thus, the ability of the bristles 101 to follow the displacement of the rotary shaft 120 is not fully performed and it results in quick abrasion of the free end 105 of bristles.

In addition, the ability of the bristles 101 having a larger diameter to follow is poor when the bristles contact the rotary shaft 120. Moreover, as the thickness of a bundle of bristles becomes larger, the ability to follow becomes poorer. Accordingly, it is limited to make the thickness of the bundle of bristles large. Thus, the sealing ability is necessarily reduced.

In the brush seal device 100 configured as above, while the brush seal 109 is pressed against the rotary shaft 120 as shown in FIG. 12, when eccentricity or vibration causes the rotary shaft 120 to contact the brush seal 109, its tilt angle is further increased.

In this condition, if the pressure of the sealed fluid is high pressure (P1), since the differential pressure (P1–P2) between the high pressure (P1) and the low pressure (P2) becomes large as shown in FIG. 9, the entire straight bristles of the brush seal 109 are pressed against the backing plate 102 and then it becomes difficult for them to deflect in response to the contact with the rotary shaft 120, that is, the ability to follow in response to the rotary shaft 120 is worsened. Also, when the sealed fluid flows into spaces between bristles 101, each bristle 101 is easily pushed apart and thus the tilted bristles 101 tend to displace at its side pushed apart such that tilt angle becomes smaller, thereby to form clearances among the bristles 101. Then the bristles 101, each of which was pushed apart and has a small tilt angle transit to the state that their length in the radial direction are longer. Accordingly, pressure exerted by the rotary shaft 120 is further increased to wear the bristles.

In routing such behaviors as describe, the clearance C that is given between the free end 105 of the bristles 101 on the side diametrically opposite to the side where the brush seal 101 is pressed against the rotary shaft 120, as shown in FIG. 12, is extended as shown in FIG. 13, causing leakage of the sealed fluid out of the clearance C.

The present invention has been made in consideration of the problems as mentioned above and the technical problems to be solved are: to reduce the resilient force exerted on the brush seal caused by the pressure of the rotary shaft so that abrasion of the brush seal by the rotary shaft can be reduced; to improve the ability of the brush seal to follow in response to the change of the rotary shaft for increasing the sealing ability; and to achieve to obtain a brush seal in the shape of a rectangular strip so as to allow resilient deformation and increase the sealing ability.

SUMMARY OF THE INVENTION

The present invention has been made to solve the problems as described above, and technical means for solving them are constituted as below.

A brush seal device of a preferred embodiment according to the present invention is one which is mounted to one of two components rotatable each other with a clearance there between, and seals the clearance, comprising: a brush seal having an attachment section for fixing one end of a row of bristles arranged in the shape of a wall and having a free end facing the surface of the other component, wherein each of the bristles in the brush seal has a bending portion in the middle for facilitating resilient buckling deformation of the bristle.

In the brush seal device of a preferred embodiment according to the present invention, in the middle of a bristle of a brush seal is defined a bending portion for facilitating resilient deformation, and the flexible bending portion can be deformed resiliently when action force from a rotary shaft exerts on the free ends of the bristles, to follow the circumference of the rotary shaft, and the sealing ability will fully perform. The brash seal may be in the shape of shape of rectangular strips, as well as the shape of wire, thereby to improve the sealing ability. Furthermore, it is allowed to reduce abrasion due to the contact of the free end of the brush seal with the circumference of the rotary shaft.

Additionally, with the ability of the bristle to follow the movement of the rotary shaft, it is easy to calculate spring constants based on the bristle and the force acting on the bristle without further calculation for other elements, resulting in easy optimum design.

The present disclosure relates to subject matter contained in Japanese Patent Application No. 2001-198813, filed on Jun. 29, 2001, the disclosure of which is expressly incorporated herein by reference in entirety.

BRIEF DESCRIPTION OF THE DRAWINGS

Some embodiments of a brush seal device of the present invention will be hereinafter described in detail with reference to the drawings. The drawings are not conceptual drawings but design drawings of correct configurations with correct dimensions. FIG. 1 is a sectional view of a brush seal device 1 that separates a clearance defined between a casing 50 and a rotor 60 of a gas turbine (also referred to as a rotation shaft) into a high pressure area P1 and a low pressure area P2. In FIG. 1, the reference numeral 1 denotes a brush seal device. A fixing section 20 at the outer circumference side of the brush seal device 1 is attached to a step section 51 defined in an inner circumference surface of the casing 50, which is one of the two rotatable components. A free end 5 at the inner circumference side of the brush seal device 1 is located to contact the outer circumference surface of the rotor 60, which is the other of the two rotatable components and is rotatable in either a clockwise X1 direction (see FIGS. 2–3) or a clockwise and counterclockwise X2 direction (see FIG. 4), or is located close to the surface. Thus, the brush seal device 1 seals the fluid to be sealed at the high pressure P1 side.

The brush seal device 1 is mainly composed of a brush seal 2, while a backing plate 6 and a holding section 10 are accessories. Therefore, only brush seal 2 may seal.

Figure 2:
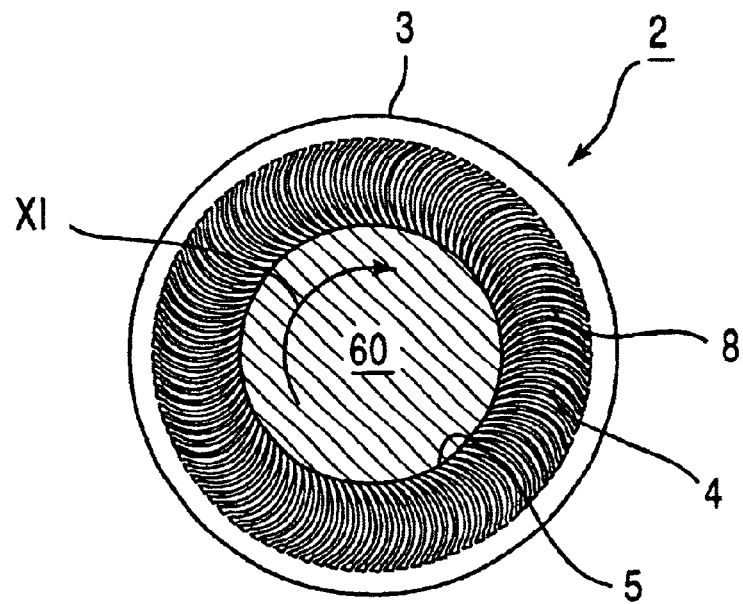
FIG. 2 is a front view, showing a brush seal of the brush seal device of the first embodiment in FIG. 1.

The brush seal 2 has bristles 4, the middle portion each of which is formed into a curvedly bending portion 8 in the shape of a recess with respect to the rotation direction of the rotor 60. The bristles 4 are made by forming a thin plate into small strips as shown in FIG. 2. A plurality of brush seals 2 are stacked in the axial direction of the rotor 60 to form a wall. Also, outer circumference end portions are welded together by a bolt or the like through a backing plate 6 and a holding section 10 to form an attachment section 3. The bristles 4 may be constituted of wires in the similar way. An embodiment of the bristle 4 has a circular or square (also, rectangular allowed) cross section. The diameter is 0.005–0.5 mm, preferably 0.02–0.2 mm or the side length is 0.01–0.1 mm and the longitudinal length is 5–50 mm. It should be determined by the sealing condition. The thickness of the wall formed by the bristles is 0.01–0.4 mm or 0.4–5 mm. As the material of bristles, steel, nickel base alloy or ceramics may be used.

Figure 1:
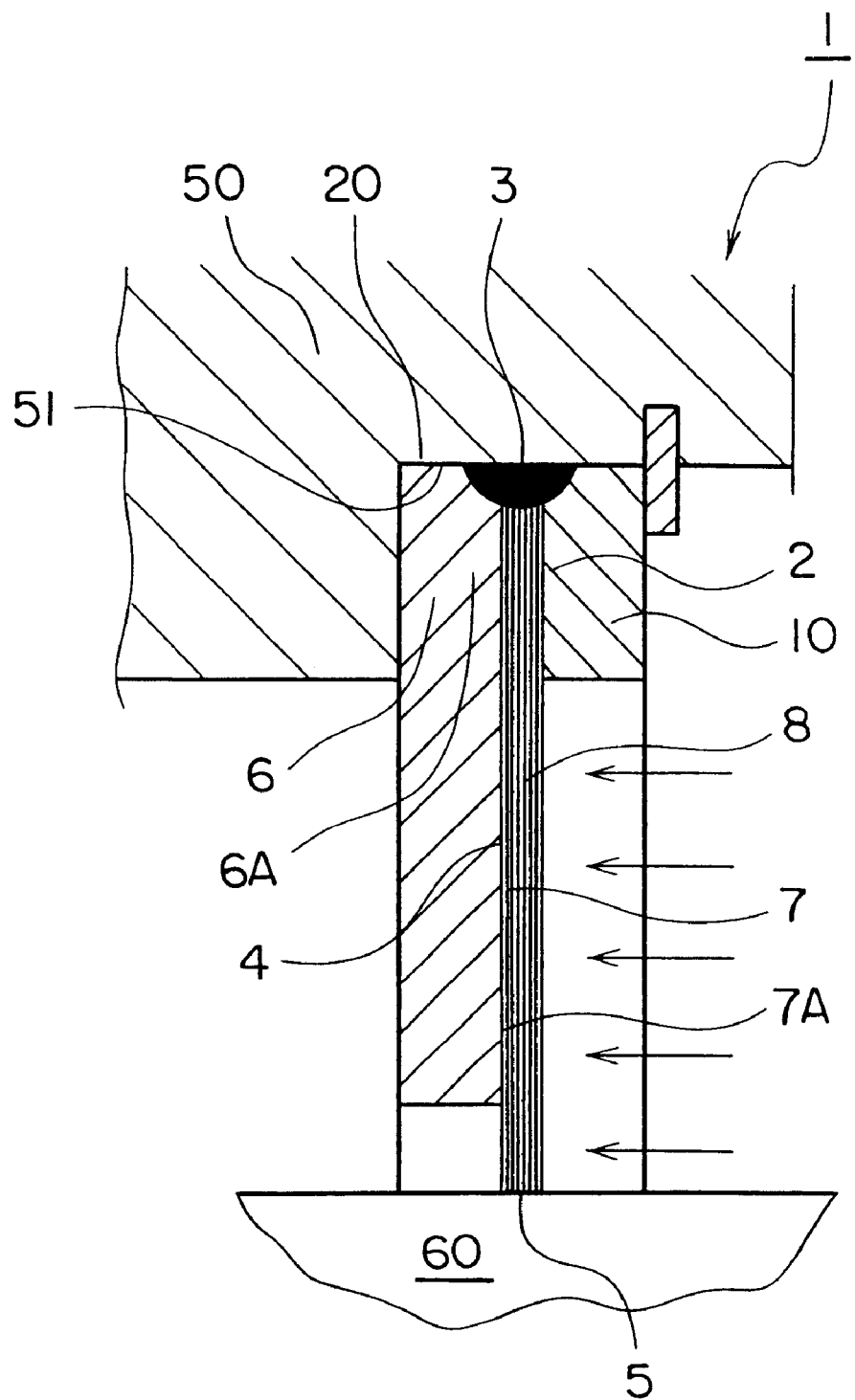
FIG. 1 is a sectional view, showing in half the first embodiment of the brush seal device according to the present invention.

The backing plate 6 has a fixing section 6A which retains the attachment section 3 of the brush seal 2 and a support surface 7 which supports the brush seal 2 against the pressure of the sealed fluid such that the brush seal 2 is not extremely bent. The brush seal 2 and the support surface 7 may contact as shown in FIG. 1, or may be separate.

The free end 5 of the brush seal 2 contacts a rotor 60 when the rotor 60 is fluctuated or oscillated to a large extent. However, since the bending portions 8 in a curved shape are formed in the middle of all the bristles 4, spring constant of the bristle 4 is small along straight direction. Thus, the brush seal 2 can be resiliently deformed in response to the oscillation of the rotor 60 even if the oscillation makes the rotor 60 contact the brush seal 2. That is, contact force can be absorbed, depending on the spring constant set for the brush seal 2 when the rotor 60 is oscillated. In addition, the bent bristles 4 further decreases the contact pressure even if the rotor 60 oscillates to larger extent, and thus the abrasion is further hindered.

An attachment section 3 of the brush seal 2 is welded together with the backing plate 6 and a support plate component 10 by electron beam or the like. The welding zone of the three components forms a fixing section 20. The holding section 10 is formed in a ring shape with smaller width in the diameter direction than that of the backing plate 6. In FIG. 1, the holding section 10 has the same length as of the fixing section 20, but its length may be close to the length of the backing plate 6 in the diameter direction. When the holding section 10 is long, a space portion in which the sealed fluid can flow into is formed between the brush seal 2 and a side face of the holding plate section 10.

Material of the backing plate 6 and a holding section 10 is preferably selected according to the coefficient of linear thermal expansion of the casing 50. For example, it is made of nickel-base alloy, iron, steel, or other non-ferrous metal. Various kinds of materials may be selected depending on the kind, temperature of the sealed fluid or other conditions in application fields.

FIG. 2 is a plan view of a brush seal 2 in the first embodiment of the present invention. Inner circumference side of a ring-shaped thin plate is formed into strips, leaving partially the outer circumference, by precision processing, such as laser beam processing, chemical etching and electric discharging, to form the brush seal 2. When bristles 4 are made of wire, they are punched to form a curved shape.

The middle portion of the brush seal 2 is formed into a bending portion 8 curved in the circumferential direction. However, the bending direction may be in the axial direction of the brush seal 2. That is, the bending portion 8 may be bent in the circumferential direction, in the axial direction, or three-dimensionally in an oblique direction of the brush seal 2. They are bundled or stacked to form a brush seal.

This machining process for making a brush seal 2 is performed such that it is press-molded first and then precisely machined into strips by etching or the like. It may be manufactured through the processes in reverse. The bending portion 8 of a curved shape may be formed so as to direct toward the rotary direction of the rotor 60.

Figure 5:
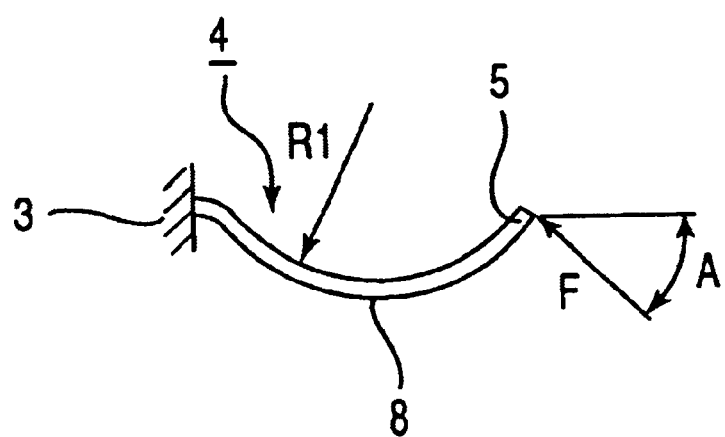
FIG. 5 is a side view, showing the bristle in FIG. 2.

FIG. 5 shows a shape of a bristle 4 in a brush seal 2 of FIG. 2. The bending portion 8 of the bristle 4 is shaped in a curve as shown in FIG. 5. The radius of the curve of the bending portion 8 is R1 and is constituted such that the load F acts from an angle A with respect to the radial direction.

The structure of the bending portion 8 decreases the spring constant. Thus, the spring constant of the bending portion 8 allows the brush seal 2 to contact and follow the rotor 60 in response to the pressure, so that sealing function is performed.

Figure 3:
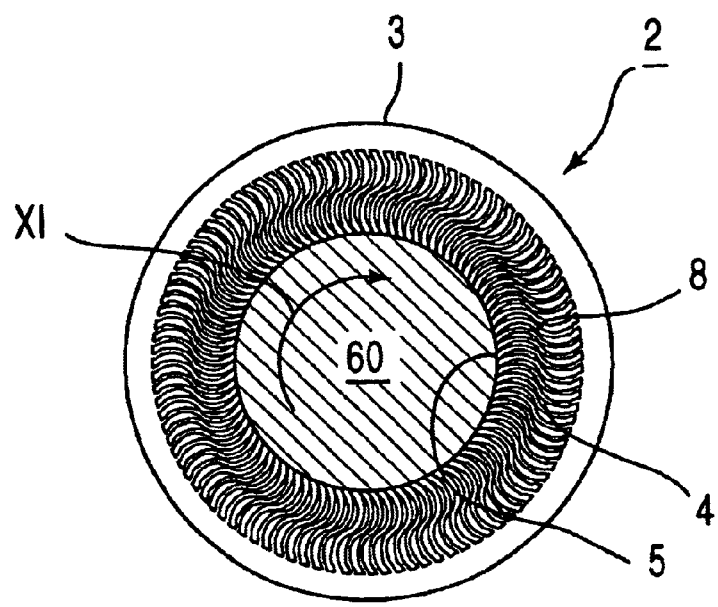
FIG. 3 is a plan view, showing the second embodiment of the brush seal of the brush seal device in FIG. 1.

FIG. 3 shows a bending portion 8 of a brush seal 2 in FIG. 2 that is formed sigmoidal, viewed as a plan view. The sigmoidal brush seal 2 is the second embodiment of the present invention. The brush seal device 1 in FIG. 3 is formed by precisely machining the inner circumference side of a ring-shaped thin plate into sigmoidal strips in the similar way as in FIG. 2. Those strips may be processed to finish by additional press process. Or, adverse processes may be used. Various processes may be selected, as necessary, based on the processes above.

Figure 6:
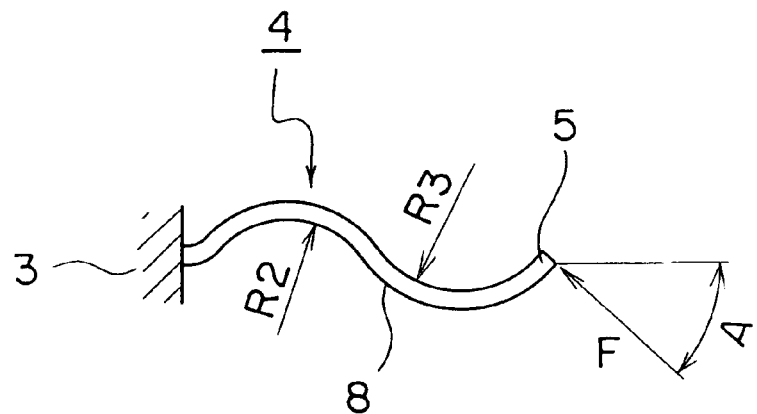
FIG. 6 is a side view, showing the bristle in FIG. 3.

FIG. 6 shows a shape of a bristle 4 in a brush seal 2 in FIG. 3. The bending portion 8 of the bristle 4 is formed in a sigmoidal shape combined with radius of curvatures of R2 and R3. The bending portion 8 is constituted such that a load F of the rotor 60 acts at an angle A with respect to the radial direction. The bristle 4 having a sigmoidal bending portion 8 has a further decreased spring constant in the buckling direction against the contact pressure of the rotor 60.

Figure 4:
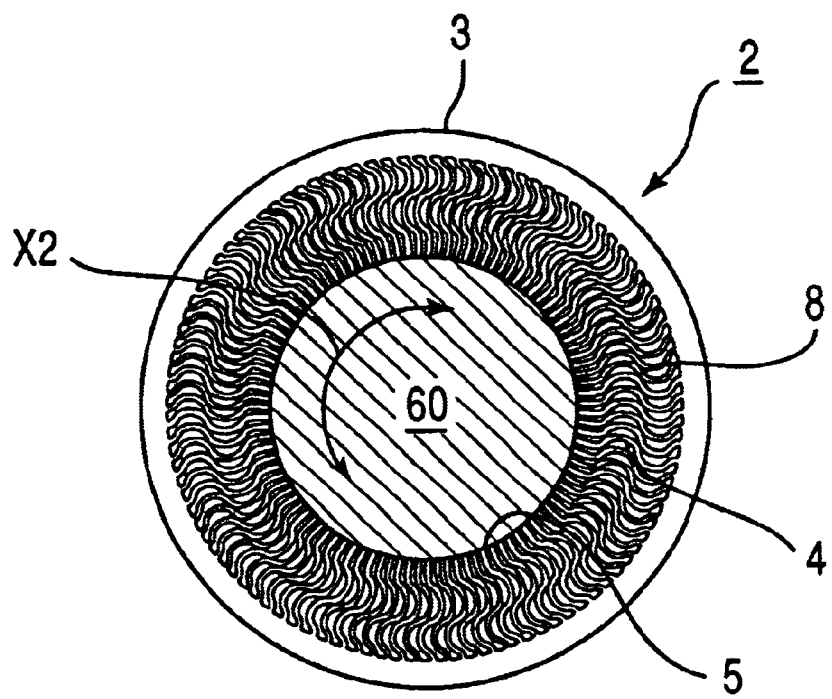
FIG. 4 is a plan view, showing the third embodiment of the brush seal of the brush seal device in FIG. 1.

FIG. 4 shows a brush seal 2 in FIG. 2, wherein a bending portion 8 is formed as a sigmoidal, seen on a plane and its free end 5 formed as a straight portion 9. The brush seal 2 is the third embodiment of the present invention. Since the straight portion 9 is formed in the inner circumference side of the brush seal 2 in FIG. 4, it has not directionality with regard to the rotary direction of the rotor 60, and the rotor 60 can rotate in its direct or reverse direction. The brush seal 2 in FIG. 4 performs similar effect as the brush seal 2 in FIG. 3.

Figure 7:
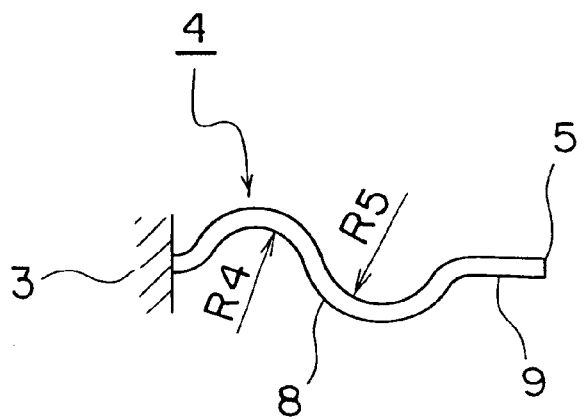
FIG. 7 is a side view, showing the bristle in FIG. 4.

FIG. 7 shows a shape of a bristle 4 in the brush seal 2 in FIG. 4. The bending portion 8 in the bristle 4 is formed as a sigmoidal shape having radii of curvature R4 and R5, and a straight portion 9 is formed at the free end 5 side. Since the load F acts linearly on the straight portion 9, the rotor 60 can rotate in its direct or reverse direction. Also, the sigmoidal bending portion 8 performs similar effect as the bristle 4 in FIG. 6 (FIG. 3).

Figure 8:
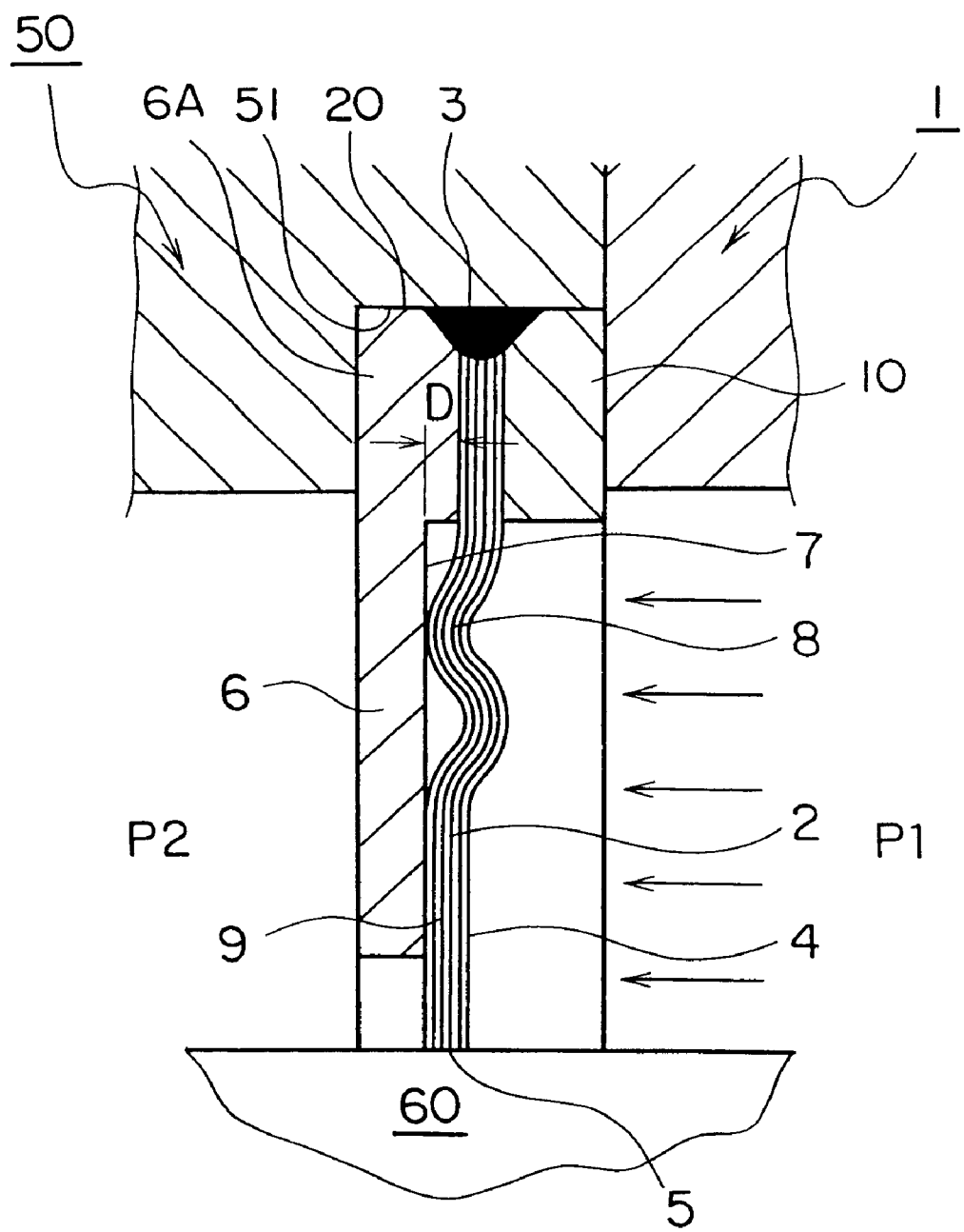
FIG. 8 is a sectional view, of the second embodiment of the brush seal device according to the present invention.
Figure 9:
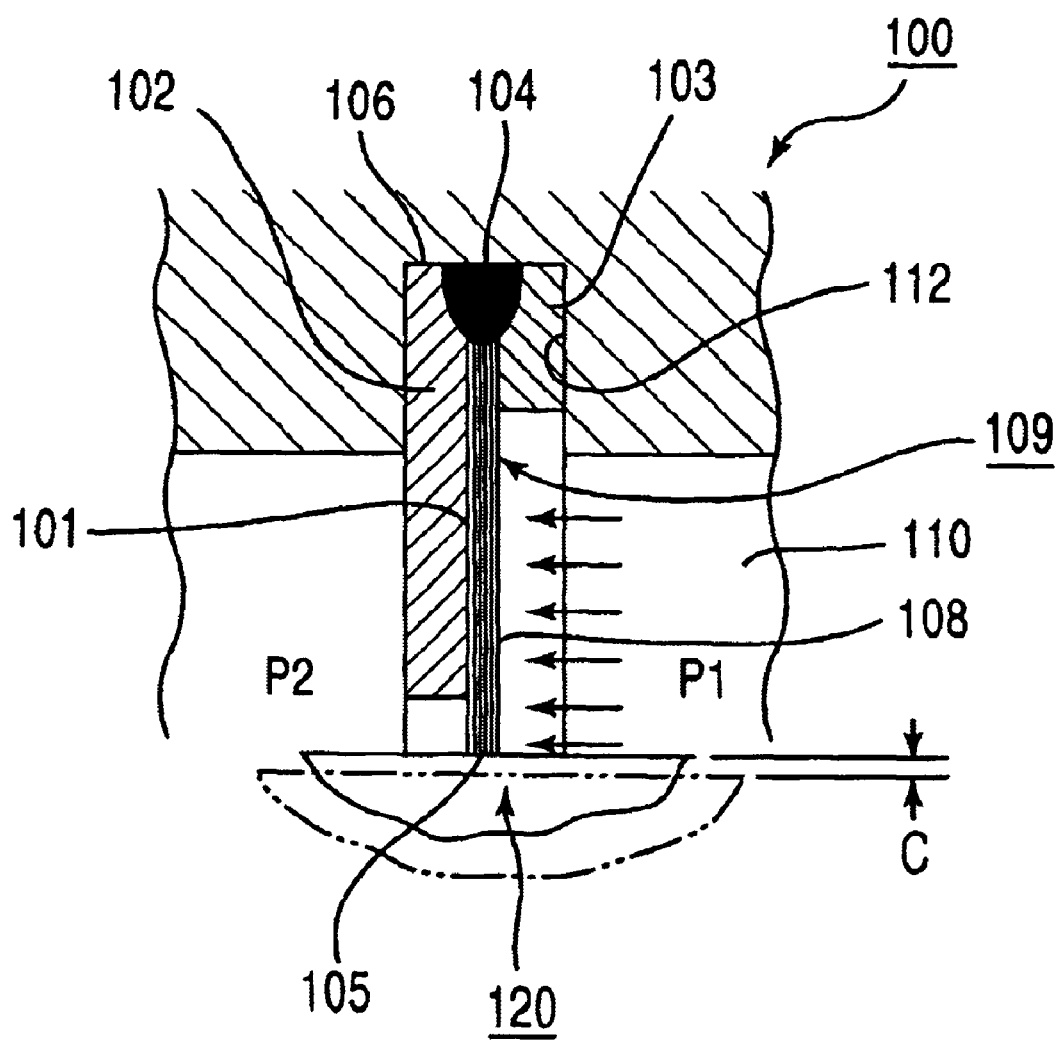
FIG. 9 is a sectional view, of a related art brush seal device.
Figure 10:
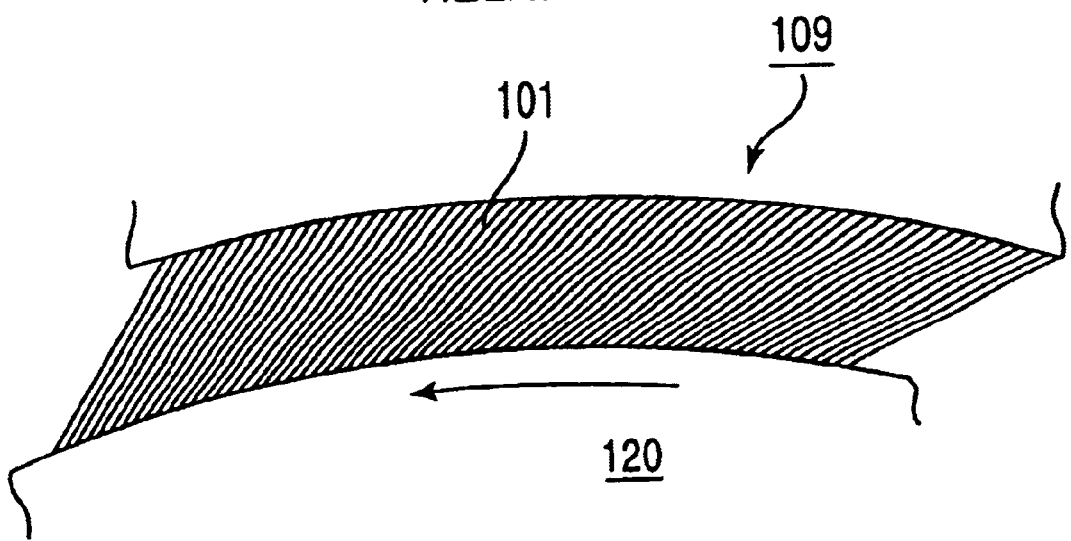
FIG. 10 is a front view, of the brush seal device shown in FIG. 9.
Figure 11:
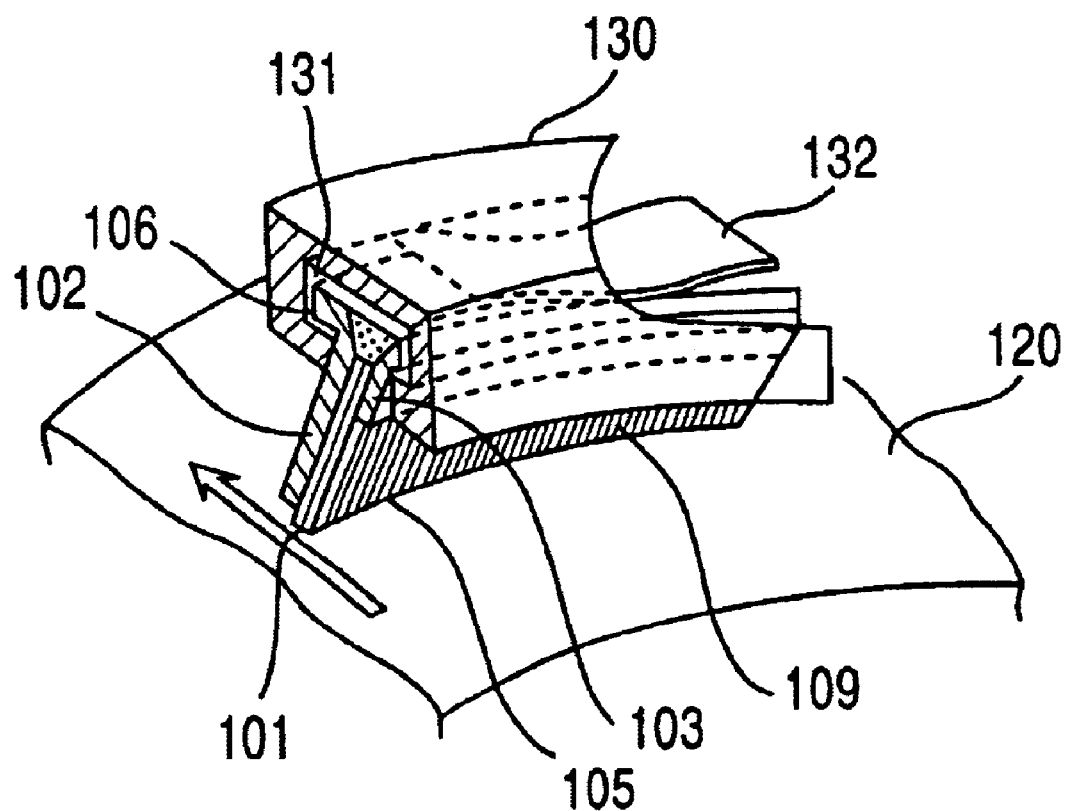
FIG. 11 is a perspective view, of another related art brush seal device.
Figure 12:
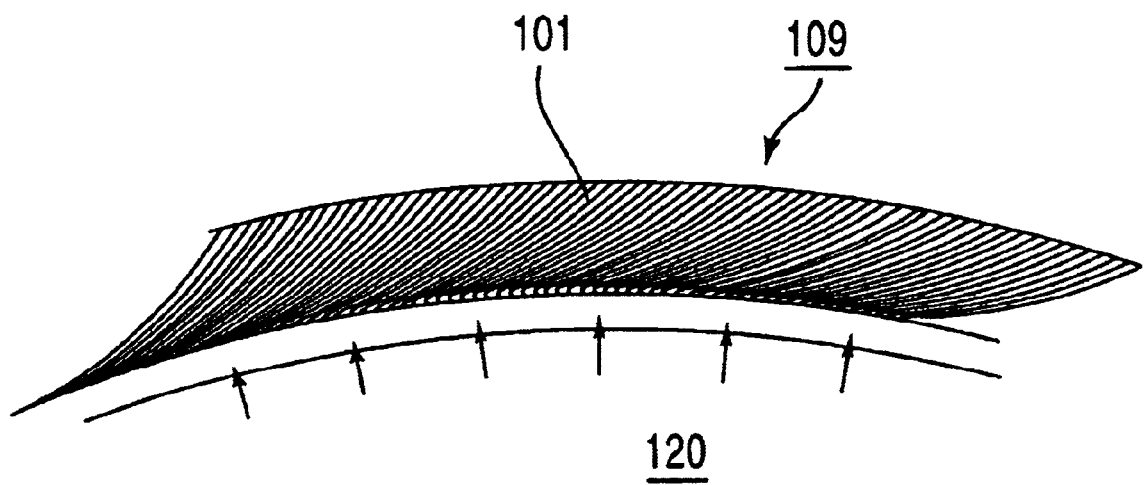
FIG. 12 is a partial front view of the brush seal device shown in FIG. 10, in which the rotary shaft is contacting the brush seal.
Figure 13:
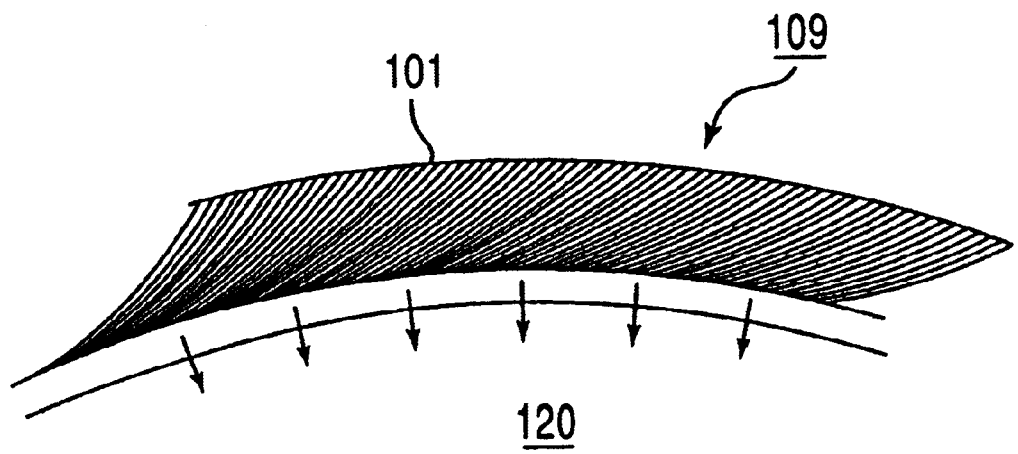
FIG. 13 is a partial front view of the brush seal device shown in FIG. 10, in which the rotary shaft is separated from the brush seal.

FIG. 8 is a sectional view of a brush seal device 1 according to the second embodiment of the present invention. The brush seal device 1 in FIG. 8 has almost the same structure as that of FIG. 1. The difference is that the shape of the bending direction of the bending portion 8 of the first embodiment is formed in circumferential direction within about 45 degrees, while the bending portion 8 in the shape a sigmoidal in the bristle 4 of the second embodiment is formed approximately in axial direction.

In addition, the support surface 7 of the backing plate 6 facing the brush seal 2 is formed at a position away from the opposing surface of the brush seal 2 by a distance D. That is, it is formed as a step by the bent length of a bending portion 8. The support surface 7 may be formed as an annular recessed portion around the circumference, as necessary.

The bristle 4 may be formed from wire material, naturally, but it may be made of a stainless plate, copper plate, aluminum plate, ceramic plate, or the like to be formed in the shape of a strip. The bristle 4 as a strip may have a cross section of rectangular, square, elliptical, or the like, as necessaries. The thickness of the wall can be set by stacking them in the axial direction depending on the pressure of the sealed fluid. As the thickness of the wall formed of layers is the result of stacking thin plates formed as strips, assembly of the brush seal 2 is made tremendously easy.

Table 1 shows the spring constant of the bending portion 8 of the bristle 4, calculated by FEM structural analysis. The values of the comparative example in the table are defined as 1.

CHART 1

| Item | Comparative Ex. example | Embodiment 1 |
| --- | --- | --- |
| displacement of a bristle (dimensionless) | 1.0 | 1.8 |
| spring constant of the bristle | 1.0F | 0.56F |

Figure 14:
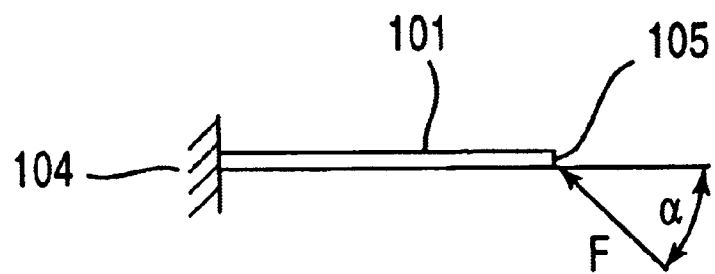
FIG. 14 is a side view, showing the bristle in FIG. 10.

Comparative example 1 is the straight bristle 4 shown in FIG. 14.

Embodiment 1 is the bristle 4 having a circular bending portion 8, shown in FIG. 5.

This result was analyzed by FEM structural analysis. The bristle 4 used in the analysis was formed by forming a thin plate into a strip as shown in FIG. 2. Material and the cross sections of the each bristle 4 are the same. Also, the load F and its action direction A are the same.

Under the same conditions like this, load F is loaded and the amount of displacement is calculated, and spring constants are calculated from the amount of displacement.

As a result of the analysis mentioned above, a bristle 4 having a circular bending portion 8 can have smaller spring constant compared to the straight bristle 4. Accordingly, the bristle 4 is superior in its ability to follow in the resilient force, and the spring constant can be smaller with good resilient force to the same displacement.

Thus, since the fixing section 20 does not have to be supported by a flat spring 132 or the like as in a related art, its structure and the fixing section 20 is easily designed and precise design with correct calculation can be realized.

The brush seal 2 further adopts an embodiment having bristles 4, among which bristles 4 made of resin arranged circumferentially in line are arranged. Also, as the bristles 4, both metal wire bristles and resin wire bristles may be used to mix. Another embodiment adopts brush seal 2 unit plates in FIG. 2, 3 or 4 stacked alternately with unit plates of brush seals made of resin in the same shape.

Still another embodiment adopts a plurality required number of brush seal 2 unit plates in FIG. 2, 3 or 4 stacked alternately with unit plates of brush seals 2 made of resin having no slits. In this case, sealed fluid can be dammed with unit plates of brush seals 2 having no slits and sliding resistance between the bristles 4 is decreased. Brush seals 2 as mentioned above can decrease sliding resistance among the bristles 4 by mixing or arranging resin and metal bristles 4.

Next, still another embodiment according to the present invention will be described. The second embodiment of a brush seal device 1 according to the present invention comprises a backing plate 6 having a support face 7 which is connected with an attachment section 3 of the brush seal 2 for supporting the brush seal 2, and a holding section 10 for supporting the attachment section 3 of the brush seal 2 between the backing plate 6 and the holding section 10.

The third embodiment of a brush seal device 1 according to the present invention comprises a brush seal 2 having bristles 4 wherein bending portions 8 are formed in a curved shape.

In the third embodiment of a brush seal device 1 according to the present invention, the curved shape allows to form easily a wall (partition wall) by stacking brush seals 2 in the axial direction, and since the curved shapes are contacted and stacked each other, action of sealed fluid cannot push away bristles 4, leakage is prevented and sealing capability is effected.

In addition, since the bending portion 8 of the bristles 4 is curved, and resilient deformation following to the load acting on the free end 5 can be improved so that responsibility of the resilient deformation to the contact of the rotary shaft is increased, the increase of sealing ability can be expected if thickness of the layers is large. Also, spring constant of the bristle 4 can be easily designed.

In the fourth embodiment of a brush seal device 1 according to the present invention comprises a brush seal 2 having bristles 4 wherein a bending portions 8 of each bristle 4 is formed in a sigmoidal shape.

With respect to the fourth embodiment of a brush seal device 1 according to the present invention, since the bending portion 8 is formed in a sigmoidal shape, it excels in resiliency for deformation and performs it superior ability to follow the action force of the contacting rotor 60. Further, the length of the bristle 4 can be increased, whereby resilient responsibility is excellent.

The fifth embodiment of a brush seal device 1 according to the present invention comprises a brush seal 2 having bristles 4 wherein a bending portions 8 of each bristle 4 is formed in a sigmoidal shape and a straight portion 9 is formed at the free end 5 side from the bending portion 8.

In the fifth embodiment of a brush seal device 1 according to the present invention, since the straight portion 9 is formed at the free end side from the bending portion 8, the rotor 60 can be rotated in the direct or reverse direction against the brush seal 2. Further, resilient deformation can be made easier against buckling when the rotor 60 contacts as mentioned above.

The sixth embodiment of a brush seal device 1 according to the present invention comprises a brush seal 2 having bristles 4 formed by forming a thin plate strip.

In respect to the sixth embodiment of a brush seal device 1 according to the present invention, since the bristles 4 are made by forming a thin plate strip, processing of the bending portions 8 can be made easy. Moreover, since the bristles 4 are formed from a thin plate, sealing ability can be increased and the ability to follow can be performed against contact. Thus, friction can be decreased and the ability to follow can be performed against contact of the rotor 60 to the bristles 4.

The seventh embodiment of a brush seal device 1 according to the present invention comprises a brush seal 2 having bristles 4 in an annular body made from thin resin plate or bristles 4 formed in strips from resin thin plate at the inner circumference side, which bristles 4 are interposed in the brush seal 2. In the seventh embodiment of a brush seal device 1 according to the present invention, since the bristles 4 in an annular body made of plate resin or in strips at inner circumference side are mixed amid layers, friction resistance can be decreased when the bristles 4 are affected by the rotor 60. In addition, an interposed annular body of a thin plate having no slits increases the dam effect on the sealed fluid.

The eighth embodiment of a brush seal device 1 according to the present invention comprises a brush seal 2 having bristles 4 formed from resin wire or having bristles 4 formed from metal wire coated with low friction material to be mixed.

In the eighth embodiment of a brush seal device 1 according to the present invention, since the annular body formed from resin plate or resin bristles 4 are interposed, friction resistance can be decreased when the bristles 4 are affected by the rotor 60 to tend to be deformed.

Since a brush seal device according to a preferred embodiment of the present invention has a bending portion amid a bristle of the brush seal which allows easy resilient deformation, the bristle is resiliently deformed according to the function of the bending portion if action force exerted by the oscillation of the rotor is effected to the free end of the bristle, and effect of performing the sealing ability by following the rotor is expected.

Also, as the brush seal may be formed by forming a thin plate into strips as well as a wire, the sealing ability can be improved and it is expected to easily manufacture the brush seal device. Further, contact abrasion on the free end of the brush seal and the circumference of the rotor is effectively prevented.

Additionally, when the ability to follow of the bristles to the rotor is reviewed in design, it is easy to calculate the spring constant from the material (characteristic) of the bristle and the force acting on the bristle, without consideration of conditions relating to other springs and friction mechanism, thereby to achieve optimum design of the bending portion of a bristle.

In case bristles are made of metal, mixing bristles made of resin can decrease friction resistance when the other component contacts those mixed bristles, resulting to allow resilient deformation with superior ability to follow. Thus, an advantage of reduction of abrasion friction generated between two mating sliding surfaces is provided.

Having described specific embodiments of the invention, however, the descriptions of these embodiments do not cover the whole scope of the present invention nor do they limit the invention to the aspects disclosed herein, and therefore it is apparent that various changes or modifications may be made from these embodiments. The technical scope of the invention is specified by the claims.

What is claimed is:

1. A brush seal device mounted to one of first and second components that are rotatable relative to each other with a clearance therebetween, and seals the clearance, comprising:

a brush seal having a plurality of strips formed by being cut from a thin annular plate, and an attachment section for fixing ends of the strips, wherein the attachment section is a non-cut portion of the annular plate and the free ends of each strip face a corresponding surface of the ether second rotatable component, wherein each strip of the brush seal has a bending portion which facilitates a resilient buckling deformation of the strips; and the bending portion has a concave curved shape relative to a direction of rotation of the second component.

2. The brush seal device according to claim 1, wherein the bending portion also a convex curved shape to define an overall s shape, and wherein the concave curved shape is disposed proximate the free end of the strip.

3. The brush seal device according to claim 2, wherein the bending portion also includes a straight portion formed on the free end of the strip and substantially perpendicular relative to a surface of the second component.

4. The brush seal device according to claim 1, further comprising:

a backing plate having a support surface coupled with an attachment section of the brush seal to support a side surface of the brush seal; and a holding section to hold the attachment section between the backing plate and the section.

5. The brush seal device according to claim 1, wherein an inner circumference side of the annular plate is cut and formed into the strips, and wherein a plurality of annular plates are stacked on one another.

6. The brush seal device according to claim 5, wherein a thin annular plate of resin bristles are interposed between the stacked annular plates, and wherein each plate of resin bristles is strip-shaped.

* * * * *